(12) United States Patent
Motahedy

(10) Patent No.: US 8,797,648 B2
(45) Date of Patent: Aug. 5, 2014

(54) PORTABLE LIGHT FILTERING DEVICE AND METHOD

(76) Inventor: Enayatullah Motahedy, Herndon, VA (US)

( * ) Notice: Subject to any disclaimer, the term of this patent is extended or adjusted under 35 U.S.C. 154(b) by 291 days.

(21) Appl. No.: 13/465,388

(22) Filed: May 7, 2012

(65) Prior Publication Data

US 2013/0293957 A1 Nov. 7, 2013

(51) Int. Cl.
*G02B 5/30* (2006.01)
*G02B 27/28* (2006.01)
*B60J 3/06* (2006.01)

(52) U.S. Cl.
CPC .......... *G02B 5/3033* (2013.01); *G02B 27/281* (2013.01); *B60J 3/06* (2013.01); *Y10S 359/90* (2013.01)
USPC ................ 359/488.01; 359/490.02; 359/900

(58) Field of Classification Search
CPC ..... G02B 5/3033; G02B 27/281; B60J 3/005; B60J 3/06
USPC ............. 359/488.01, 490.01, 490.02, 490.03, 359/900
See application file for complete search history.

(56) References Cited

U.S. PATENT DOCUMENTS

| | | | | |
|---|---|---|---|---|
| 2,199,715 A * | 5/1940 | Sauer | ................. | 359/490.02 |
| 2,263,684 A * | 11/1941 | Ryan | ................. | 362/19 |
| 2,291,347 A * | 7/1942 | Ryan | ................. | 355/71 |
| 2,298,059 A * | 10/1942 | Land | ................. | 359/487.02 |
| 2,825,271 A * | 3/1958 | McKae | ................. | 396/276 |
| 2,856,810 A * | 10/1958 | Frost | ................. | 359/488.01 |
| 3,431,044 A * | 3/1969 | Clark | ................. | 359/489.19 |
| 3,521,940 A * | 7/1970 | Heckman, Jr. | ................. | 359/489.19 |
| 3,528,722 A | 9/1970 | Makas | | |
| 3,635,543 A * | 1/1972 | Collins | ................. | 359/489.14 |
| 3,663,089 A | 5/1972 | Makas | | |
| 4,123,141 A | 10/1978 | Schuler | | |
| 4,285,577 A | 8/1981 | Schuler | | |
| 4,893,908 A | 1/1990 | Wolf et al. | | |
| 5,042,923 A | 8/1991 | Wolf et al. | | |
| 5,164,856 A | 11/1992 | Zhang et al. | | |
| 5,189,552 A | 2/1993 | Mewalli | | |
| 5,197,242 A | 3/1993 | Baughman et al. | | |
| 5,260,827 A * | 11/1993 | Dziekan | ................. | 359/488.01 |
| 5,940,216 A | 8/1999 | Gibbs | | |
| 6,386,737 B1 * | 5/2002 | Hopp et al. | ................. | 362/282 |
| 6,414,790 B1 | 7/2002 | Bennett | | |
| 6,536,828 B2 | 3/2003 | Love et al. | | |
| 6,601,973 B2 * | 8/2003 | Rasmussen et al. | ................. | 362/282 |
| 6,674,419 B2 | 1/2004 | Ilcisin et al. | | |
| 6,762,871 B2 | 7/2004 | Yoshimura | | |
| 7,206,125 B2 | 4/2007 | Wang | | |
| 7,245,205 B2 | 7/2007 | Strohband et al. | | |
| 7,300,167 B2 | 11/2007 | Fernando et al. | | |
| 7,355,161 B2 | 4/2008 | Romig et al. | | |
| 7,370,990 B2 * | 5/2008 | Juřík | ................. | 362/227 |
| 7,414,772 B2 | 8/2008 | Yoshimura et al. | | |

(Continued)

*Primary Examiner* — Ricky D Shafer
(74) *Attorney, Agent, or Firm* — Intellalegal; James W. Pravel

(57) ABSTRACT

A portable light filtering device includes at least two sheets of polarized film material. Each of the at least two sheets are mounted on separate mounting rings that rotate relative to one another such that when the lines of polarization are perpendicular to one another, the amount of light that can pass through is minimized and when the lines of polarization are parallel, the amount of light that can pass through is maximized. The separate mounting rings are held together in a rotational relationship and include a mounting bracket to removeably attach the device to a car window, to the ledge of a car door or to any desired window from which light screening is desired.

10 Claims, 10 Drawing Sheets

(56) References Cited

U.S. PATENT DOCUMENTS

| | | |
|---|---|---|
| 7,505,136 B2 | 3/2009 | Romig et al. |
| 7,534,016 B2 | 5/2009 | Stavaeus et al. |
| 7,535,614 B1 | 5/2009 | Tapley et al. |
| 7,773,299 B2 | 8/2010 | Martin |
| 7,822,490 B2 | 10/2010 | Bechtel et al. |
| 2007/0097503 A1 | 5/2007 | Tsuji |
| 2009/0027759 A1 | 1/2009 | Albahri |
| 2009/0092771 A1 | 4/2009 | Sasata et al. |

* cited by examiner

PORTABLE LIGHT FILTERING DEVICE AND METHOD

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This invention relates to the field of light filtering and filtering devices. Specifically, the invention relates to a portable light filtering device that uses multiple sheets of polarized film.

2. Background

Reducing transmitted light is useful for vehicles, buildings, homes and anywhere else that it may be desired to reduce the amount of light entering a space. Reducing the light passing through glass has been solved in several different ways.

Tinted film can be attached directly to the inside of glass. This tends to be permanent and may be too dark which can compromise night vision and if used on vehicle glass in some states, it can result in a police citation.

Shades or blinds are practical in homes and buildings but are not very practical in vehicles.

Plasma addressed liquid crystal ("PALC") can be used to assume an opaque state to reduce the transmission of light through glass. For example, see U.S. Pat. Nos. 6,674,419 and 7,245,205. However, the use of PALC requires sophisticated electronic controls and the PALC material alone is exceedingly expensive.

Window tinting using polarized film is known. Polarized film has been used in a single layer and in multiple layers to block light or vary the amount of light that is transmitted through glass.

When polarized film is used, either in a single layer or in multiple layers; it is incorporated into a complex assembly that becomes an integral part of the window unit. For example, in U.S. Pat. No. 5,940,216 two layers of polarized film are used, with the lines of polarization of each layer being parallel to the other layer. The lines of polarization are shifted relative to the other layer by using a relatively complex motor and cam mechanism.

SUMMARY OF THE INVENTION

What is needed is a portable light filtering device that can be used on windows. It should be useable to filter sunlight that passes through windows in vehicles and also be useable to filter sunlight in a home or in other desired buildings. It should be externally removable from the glass surface so that it can be easily removed as desired and moved to a different, desired window location. It should also be inexpensive relative to currently existing light filtering devices and it should include multiple mounting options. It should be universally useable by all vehicles.

The present invention relates to a light filtering device for windows that satisfies the long felt but unsatisfied need that the present invention solves. The device comprises an inner screen and an outer screen. Each of the screens is comprised of a polarized film material. The inner screen is secured to an inner mounting ring with an inner retaining ring and the outer screen is secured to an outer mounting ring with an outer retaining ring. Each retaining ring may be secured to the mounting rings with machine screws, with an adhesive or with a desired bonding agent.

The inner mounting ring has a top inner shoulder on an inner circumference of the inner mounting ring and the outer mounting ring has a bottom inner shoulder on an inner circumference of the outer mounting ring. A coupling ring has a coupling gap on an interior circumference of the coupling ring. The inner mounting ring and the outer mounting ring are in rotatable contact with each other. The top inner shoulder of the inner mounting ring and the bottom inner shoulder of the outer mounting ring are slideably engaged with the coupling gap of the coupling ring whereby each of the coupling rings are slideably engaged and whereby the inner screen and the outer screen can rotate relative to one another.

Each of the mounting rings includes a wall on the outer circumference of each mounting ring. The wall of the inner mounting ring slideably engages the wall of the outer mounting ring. A set of splines is positioned along an inner wall of the outer mounting ring and a ratchet tab is positioned on the wall of the inner mounting ring whereby the ratchet tab engages the set of splines to provide a ratcheting action when the outer mounting ring rotates relative to the inner mounting ring. The ratcheting action also provides reliable positioning of the mounting rings and the polarized films relative to one another and prevents uncontrolled rotation thereof.

An inner tab is provided on the inner mounting ring and an outer tab is provided on the outer mounting ring whereby the inner mounting ring and the outer mounting ring can be rotated relative to one another and whereby the relative position of each mounting ring can be visually determined. When the two tabs are aligned together, the lines of polarization of the inner and outer screens are perpendicular to one another to restrict or filter the maximum amount of light. The restricted light source that is restricted or filtered is typically sunlight, but any other light source can also be filtered as desired. When the two tabs are separated by a quarter of a turn (90 degrees), the inner and outer screens allow the maximum amount of light. Thus, the user can control the amount of light and see visually the amount of light restricted by the relative positions of the two tabs.

An adjustable arm is attached to the light filtering device and a mounting fixture is attached to the adjustable arm, whereby the light filtering device can be mounted to the interior of a car door. The light filtering device can also be moved to any other window inside a building or structure.

The portable light filtering device can be mounted to a mounting fixture that comprises a ledge mounting bracket for suspending and mounting the light filtering device to the ledge on the door of a vehicle. The ledge mounting bracket can be bendable to allow for mounting on a variety of ledge shapes. Alternatively, the portable light filtering device can be mounted to a window with suction cup mounting bracket which suspends the light filtering device to the window on the interior of a vehicle.

The portable light filtering device for windows can include a plurality of bearing retainers that are positioned between each of the mounting rings; wherein at least one bearing is positioned within each of the bearing retainers whereby each at least one bearing provides for reduced friction between the mounting rings to provide easy rotation of the inner screen and the outer screen relative to one another.

Unlike polarized film that is glued to the inside of windows and allows approximately 50% transmittance of light, the instant invention reduces transmittance of light to approximately 0.093%.

The instant invention provides many additional surprising and unexpected results including providing protection against:

visible sunlight;
heat generated by excessive sunlight; and
possible theft by shielding contents from outside view.

Yet further, the device also provides privacy for passengers. It provides a safety benefit for vehicle drivers by reducing glare caused by sunlight. Further still, it protects the interior of vehicle from the harmful effects of ultra violet degradation from the sun light.

Other than the polarized screens, the components that are included for the inventive device may be constructed of polymers or of metallic materials or of any other desired materials.

BRIEF DESCRIPTION OF THE DRAWINGS

FIG. 5 shows the inventive light filtering device with the outer polarized screen and inner polarized screen aligned to allow the maximum amount of light to pass through.

FIG. 6 shows the inventive light filtering device with the outer polarized screen and inner polarized screen oriented to allow the minimum amount of light to pass through.

DETAILED DESCRIPTION OF THE INVENTION

For ease of understanding the invention in relation to the detailed description, the following parts list is provided:

| Part Number | Description |
| --- | --- |
| D | sunscreen device |
| L | door ledge |
| 20a | inner retaining ring |
| 20b | outer retaining ring |
| 21a | inner uniform retaining ring |
| 21b | outer uniform retaining ring |
| 22 | machine screw |
| 22a | securing hole |
| 22b | threaded hole |
| 24a | inner polarized screen |
| 24b | outer polarized screen |
| 26 | inner mounting ring |
| 26a | inner mounting ring wall |
| 27 | lower inner surface of outer mounting ring |
| 28 | outer mounting ring |
| 28a | outer mounting ring wall |
| 30 | coupling ring |
| 31a | inner coupling lip |
| 31b | outer coupling lip |
| 32 | coupling gap |
| 34 | ratchet tab |
| 34a | ratchet tab retainer |
| 42 | ratcheting teeth |
| 44 | first inner shoulder |
| 46 | second inner shoulder |
| 52 | flexible arm |
| 54 | ledge mounting bracket |
| 62 | surface mounting bracket |
| 72 | mounting arm |
| 74 | suction cup |
| 75 | bearing retainer |
| 80a | upper bearing |
| 80b | lower bearing |
| 82a | inner tab |
| 82b | outer tab |
| S1 | inlet sunlight |
| S2 | maximum outlet sunlight |
| S3 | minimum outlet sunlight |

Figure 1:
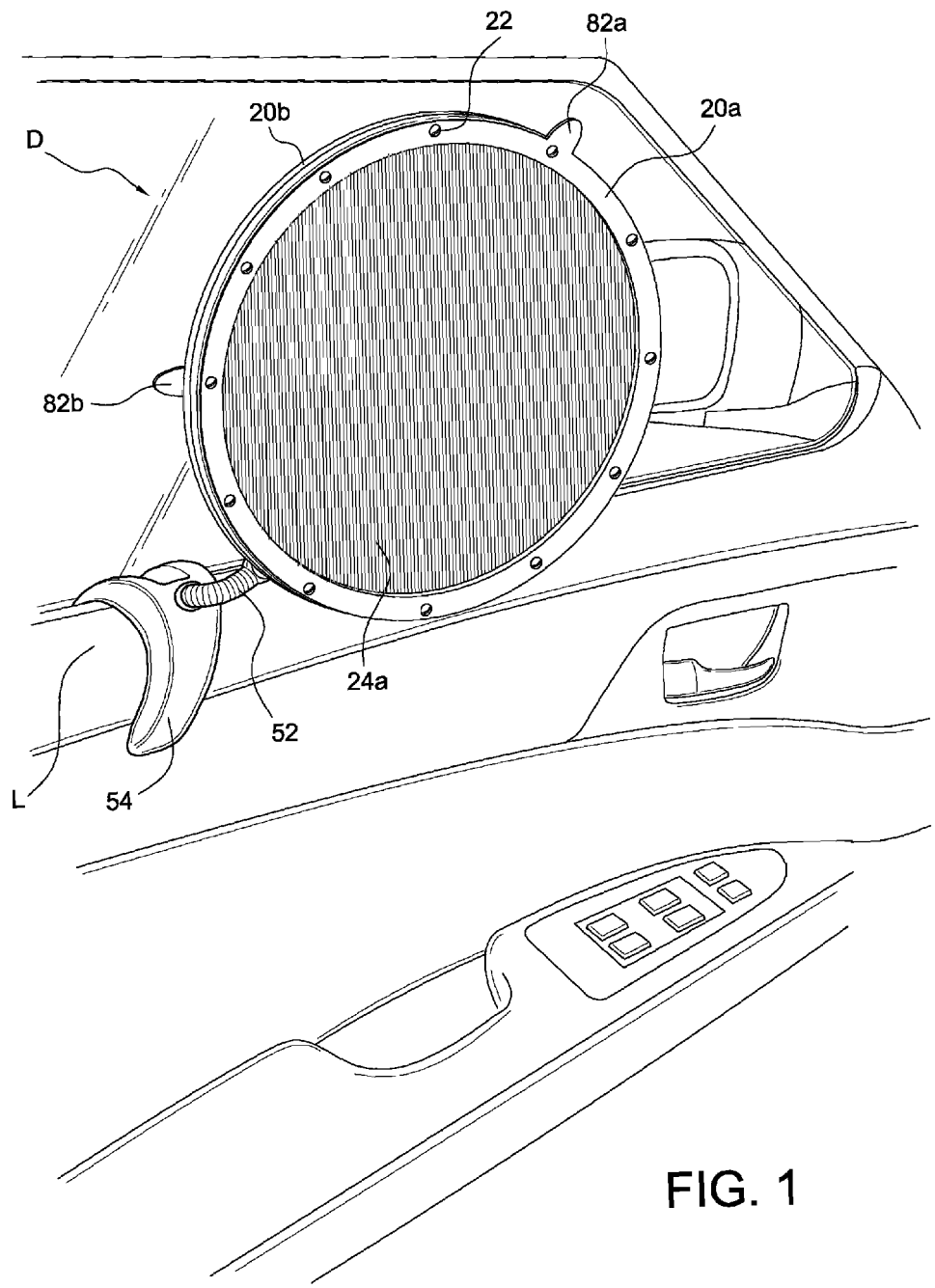
FIG. 1 is a perspective view of the inventive light filtering device shown mounted to the inside of a car with a ledge mount.
Figure 2:
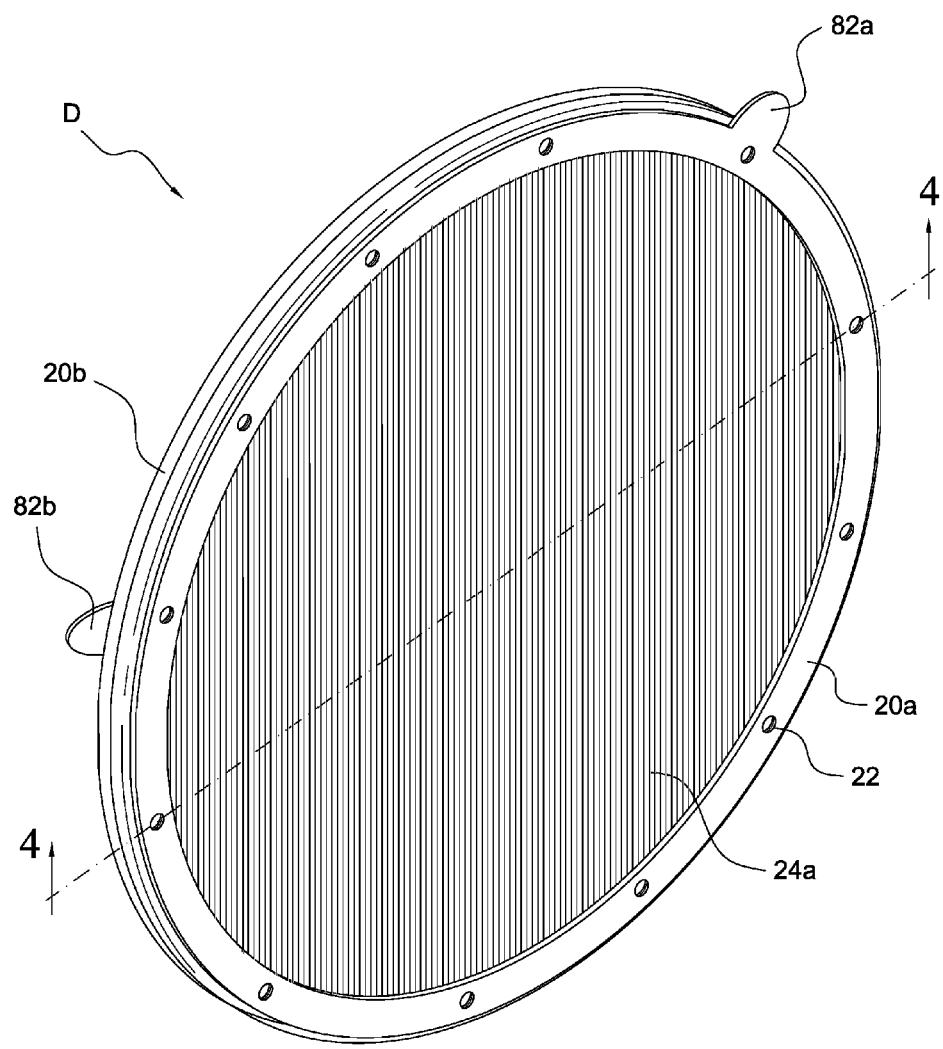
FIG. 2 shows the inventive light filtering device including section line 4-4.

FIG. 1 shows an embodiment of the portable light filtering device D as used in a vehicle using the ledge mounting bracket 54 which is attached to a window ledge L of a car door. A flexible arm 52 connects the mounting bracket 54 to the outer retaining ring 20b, but may also be connected to the inner retaining ring 20a. The flexible arm 52 allows the light filtering device D to be adjusted to the desired position relative to the window and relative to the direction of incoming sunlight. The mounting bracket 54 can be shaped to conform to the shape of the ledge L of the car door. It can also be constructed of a bendable material to more accurately conform to the shape of the car door ledge. The mounting bracket 54 can also include a hook and loop fastener material to attach it to the ledge L of the car door.

Figure 7:
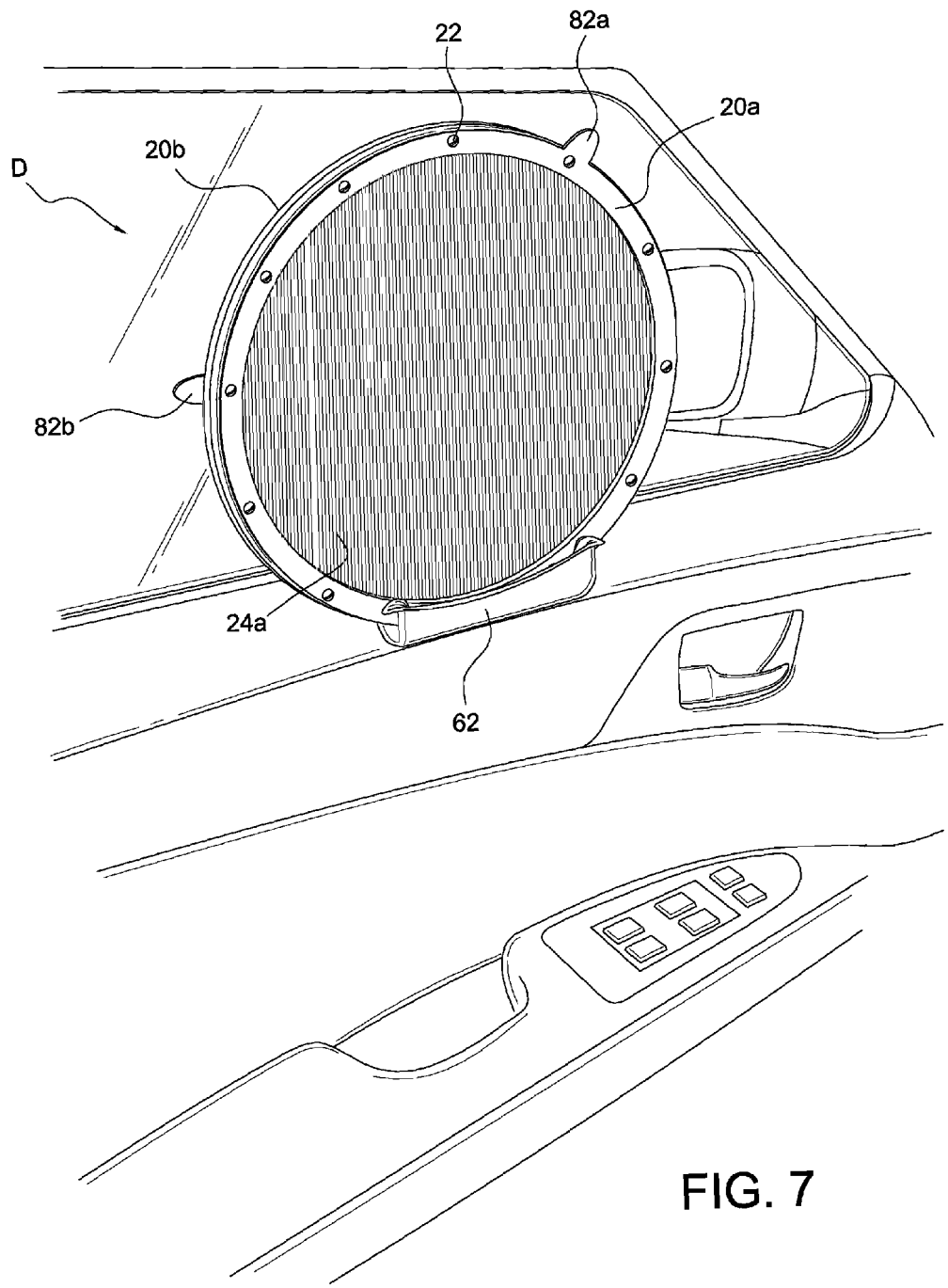
FIG. 7 shows the inventive light filtering device mounted to the inside of a car with a surface mount.

FIG. 7 shows the light filtering device D secured to the inside of a car door by inserting the assembled inner retaining ring 20a and outer retaining ring 20b into the surface mounting bracket 62. This provides a fixed position for the screen device D on the inside of the car door and car window. The surface mounting bracket 62 may be permanently affixed to a desired position on the interior surface of a car door or it can be releasably attached using a hook and loop type fastener.

Figure 8:
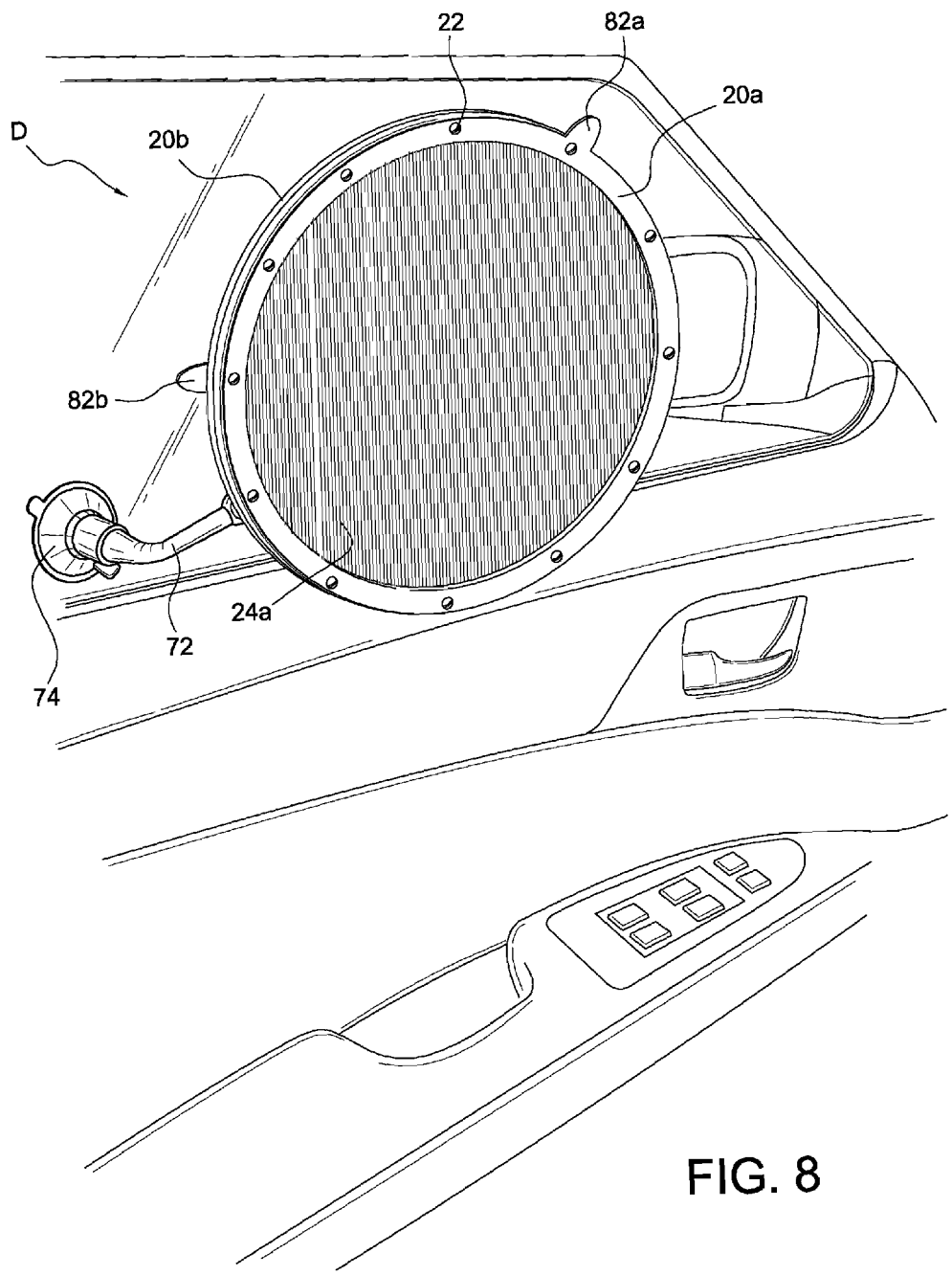
FIG. 8 shows the inventive light filtering device mounted to the inside of a car with a window mount.

FIG. 8 shows the light filtering device D secured to a car window with a suction cup 74 that is attached to the window. The suction cup 74 is connected to a mounting arm 72, which may be rigid or flexible so that the light filtering device D can be positioned as desired relative to the window and relative to the direction of incoming sunlight. Flexible mounting arm 72 and rigid mounting arm 52 are interchangeable and may be mounted on the outer mounting ring 20b or to the inner mounting ring 20a, permanently or with removable fasteners.

Figure 3:
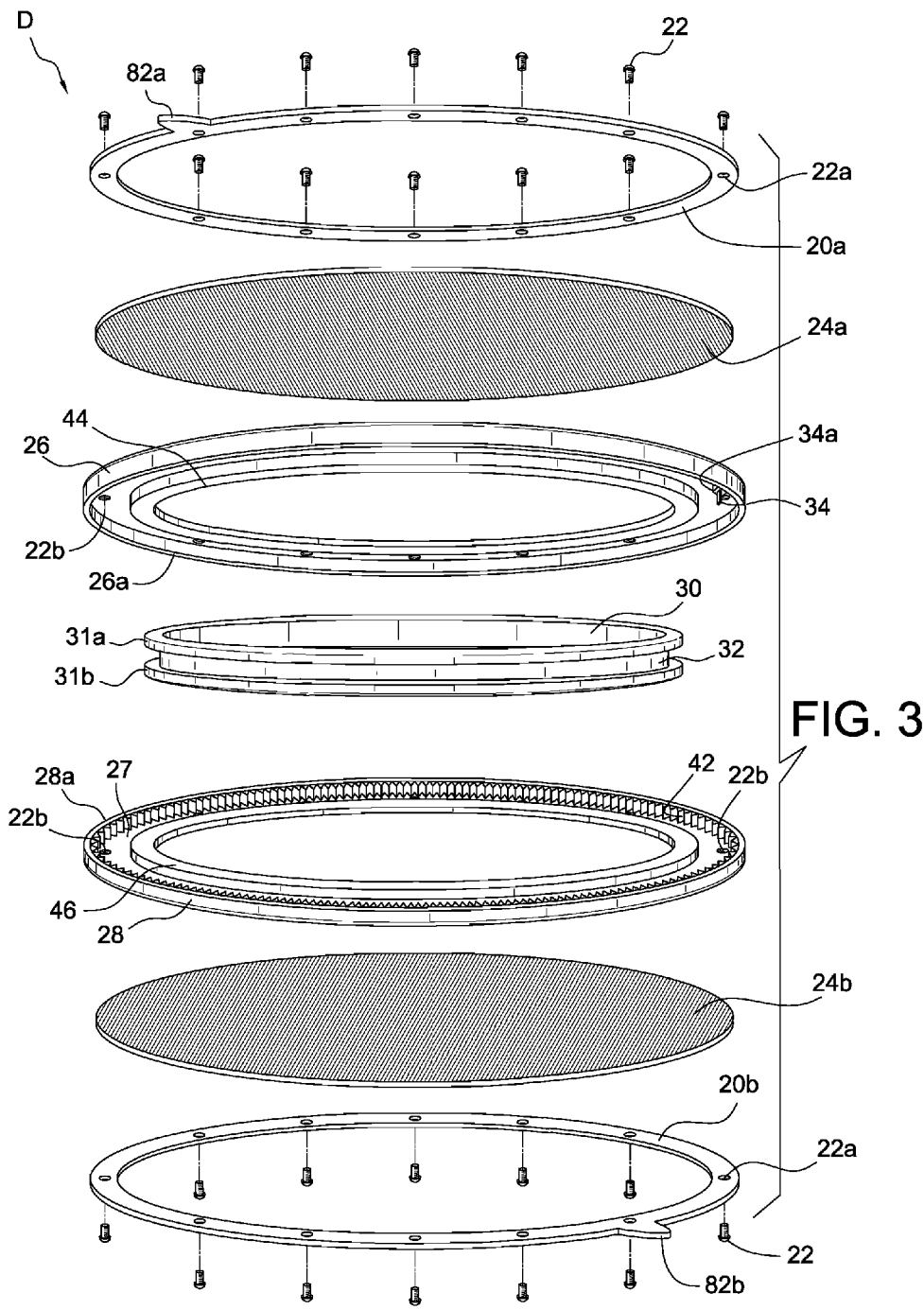
FIG. 3 is an assembly drawing of the inventive light filtering device.

Refer now to FIG. 3, which shows an assembly drawing of the light filtering device D. An inner retaining ring 20a secures an inner polarized screen 24a to an inner mounting ring 26 with a plurality of machine screws 22. The machine screws 22 are inserted through the securing holes 22a and engage each threaded hole 22b. An outer retaining ring 20b secures an outer polarized screen 24b to an outer mounting ring 28 with a plurality of machine screws 22. The machine screws 22 are inserted through the securing holes 22a and engage each threaded hole 22b in the lower inner surface 27 of the outer mounting ring 28.

Figure 4:
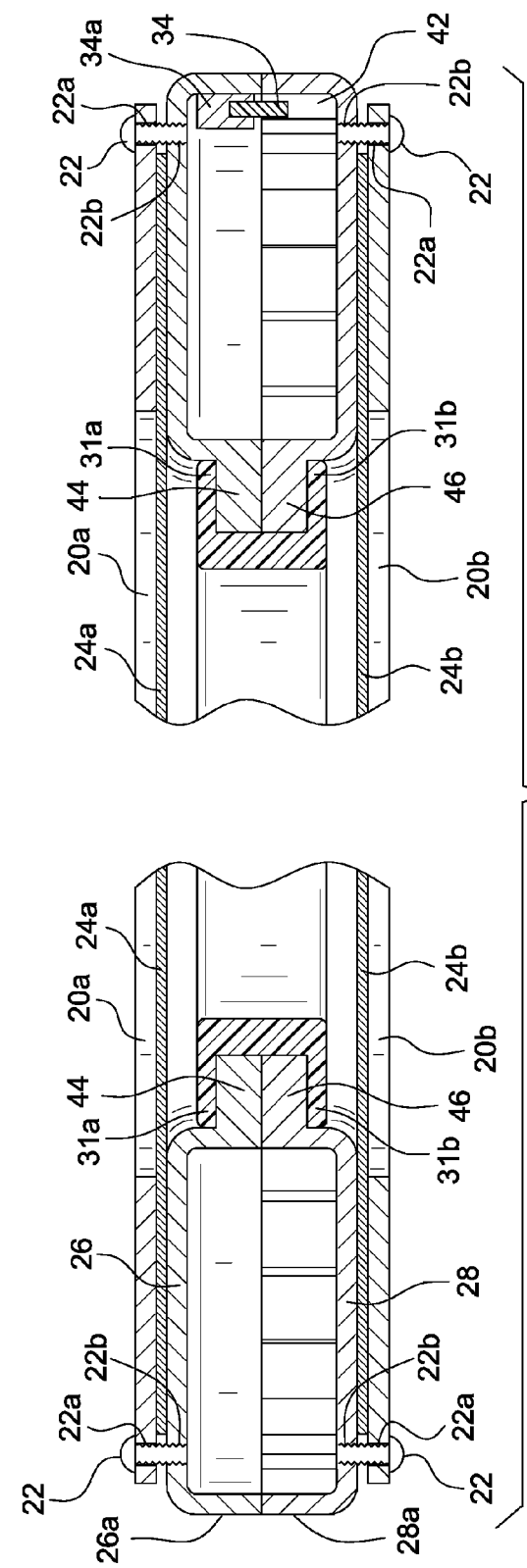
FIG. 4 shows the section view of the inventive light filtering device taken from line 4-4 of FIG. 2.

Refer to both FIGS. 3 and 4 to see the inner mounting ring 26 which has a first inner shoulder 44 about the inner circumference of the inner mounting ring 26 and the outer mounting ring 28 has a second inner shoulder 46 about the inner circumference of the outer mounting ring 28. A coupling ring 30 includes a coupling gap 32 that is at least as wide as the width of the first inner shoulder 44 and the second inner shoulder 46 when the first inner shoulder 44 and the second inner shoulder 46 are positioned together. The coupling ring 30 is typically constructed of a resilient material, such as a resilient polymer, that allows the coupling ring 30, the inner coupling lip 31a and the outer coupling lip 31b to flex so that the coupling lips 31a, 31b can be positioned to capture the first inner shoulder 44 and the second inner shoulder 46 within the coupling gap 32. The coupling gap 32 is sufficiently wide that the first inner shoulder 44 and second inner shoulder 46 are free to slide relative to one another but they are maintained in an assembled configuration.

The inner mounting ring 26 has a wall 26a about the outer perimeter of the inner mounting ring 26. The outer mounting ring 28 has a wall 28a about the perimeter of the outer mounting ring 28. The outer edge of the wall 26a slideably engages with the outer edge of the wall 28a, while the outer surface of the first inner shoulder 44 slideably engages with the outer surface of the second inner shoulder 46, as best seen in FIG. 4.

A plurality of splines form ratcheting teeth 42 along the inner surface of the outer mounting ring wall 28a. A ratchet tab 34 is positioned on the inner surface of the inner mounting ring wall 26a. The ratchet tab 34 is constructed of a resilient material and is secured to the inside wall of the inner mounting ring wall 26a with a ratchet tab retainer 34a. The ratchet tab 34 engages the ratcheting teeth 42 thereby creating a ratcheting effect and clicking sound as the inner mounting ring 26 and outer mounting ring 28 rotate relative to one another. This helps to provide secure rotational effect and prevents the inner and outer mounting rings 26, 28 from rotating uncontrollably. The ratcheting teeth 42 could also be positioned along the lower inner surface 27 of the outer mounting ring 28 wherein the ratcheting tab 34 engages the ratcheting teeth 42 as the inner mounting ring 26 and outer mounting ring 28 rotate relative to one another.

A tab 82a is positioned on the inner retaining ring 20a and a tab 82b is positioned on the outer retaining ring 20b. Tabs 82a and 82b provide a means for rotating the inner retaining ring 20a and outer retaining ring 20b relative to one another. Because the inner polarized screen 24a is attached to the inner mounting ring 26 with the inner retaining ring 20a and the outer polarized screen 24b is attached to the outer mounting ring 28 with the outer retaining ring 20b, moving tab 82a relative to tab 82b rotates the inner polarized screen 24a relative to the outer polarized screen 24b. The relative positions of the tabs 82a and 82b provides a visual reference to indicate whether the inner and outer screens 24a, 24b are allowing a maximum or a minimum amount of light through the inner and outer screens 24a, 24b. Instead of tabs 82a, 82b, the outer edges of the retaining rings 20a, 20b can be serrated and indicia or other representing indicators can be placed on the surface of each edge to indicate the relative position of the retaining rings 20a, 20b and therefore the relative positions of the screens 24a, 24b.

Figure 5:
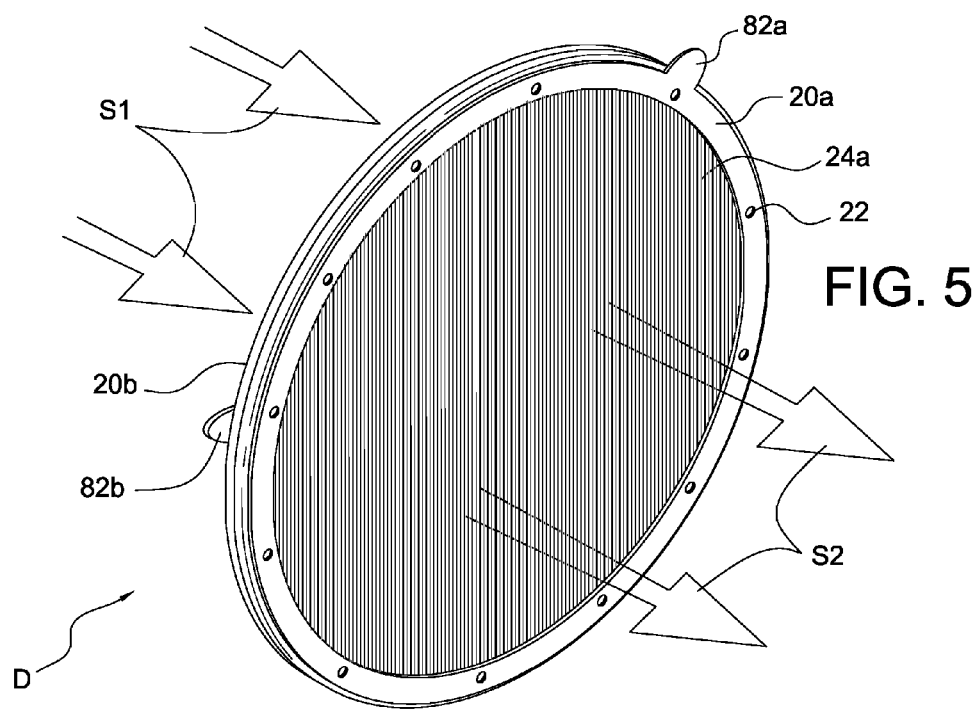
Figure 6:
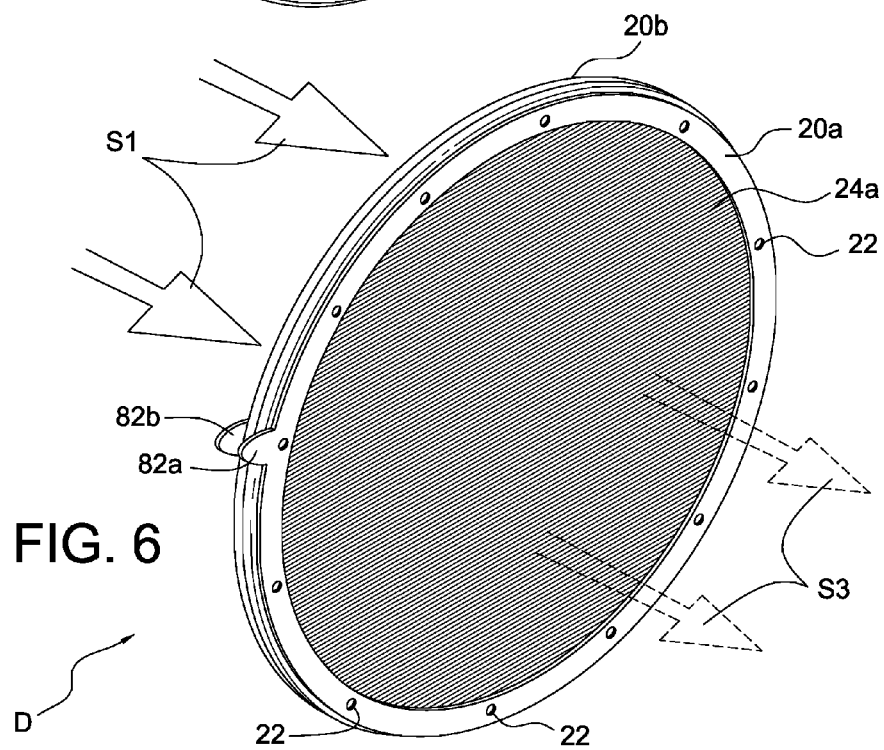

Refer now to FIGS. 5 and 6. In FIG. 5 the lines of polarization of the inner polarized screen 24a are oriented in the same direction as the lines of polarization of the outer polarized screen 24b. When the lines of polarization are oriented in the same direction on each of the polarized screens 24a, 24b, the amount of light entering S1 is not restricted so the amount of light existing S2 is the same amount as the amount of light entering S1. In FIG. 6 the lines of polarization of the inner polarized screen 24a are oriented perpendicularly to the lines of polarization of the outer polarized screen 24b. When the lines of polarization on each of the polarized screens 24a, 24b are oriented perpendicularly, the amount of light entering S1 is restricted so the amount of light existing S3 is significantly reduces from the amount of light entering S1. The amount of light existing S3 can be as little as 0.093% of the amount of light entering S1.

An inner tab 82a is shown on the top of the inner retaining ring 20a and an outer tab 82b is shown on the outer retaining ring 20b. The tabs 82a, 82b are used to rotate the inner and outer polarized screens 24a, 24b relative to one another to reduce or allow the desired amount of light to pass through the polarized screens 24a, 24b. When the tabs 82a, 82b are rotated relative to one another, the ratchet tab 34 engages the ratcheting teeth 42 to provide a controlled rotational movement and also provides a clicking sound as the inner and outer retaining rings 20a, 20b are rotated relative to one another (Best seen in FIGS. 3 and 4).

Figure 9:
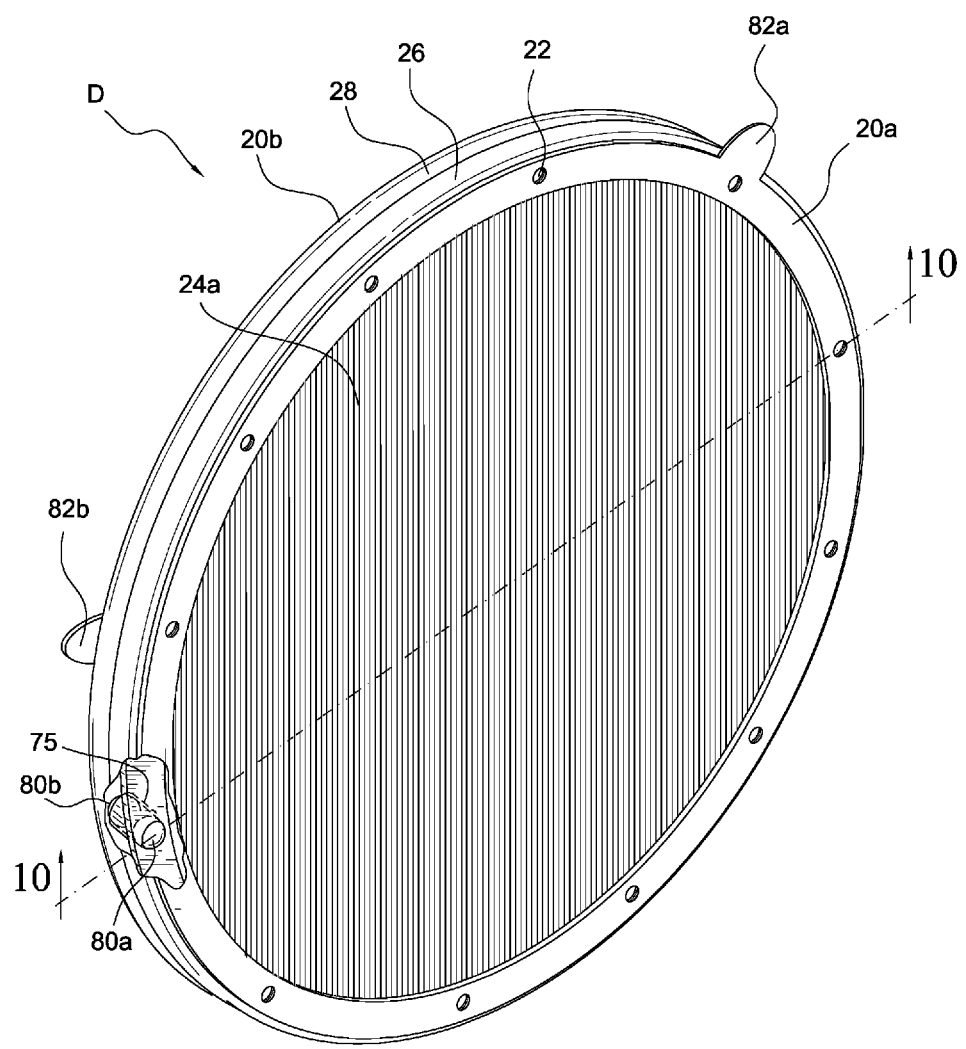
FIG. 9 shows the inventive light filtering device including section line 10-10.
Figure 10:
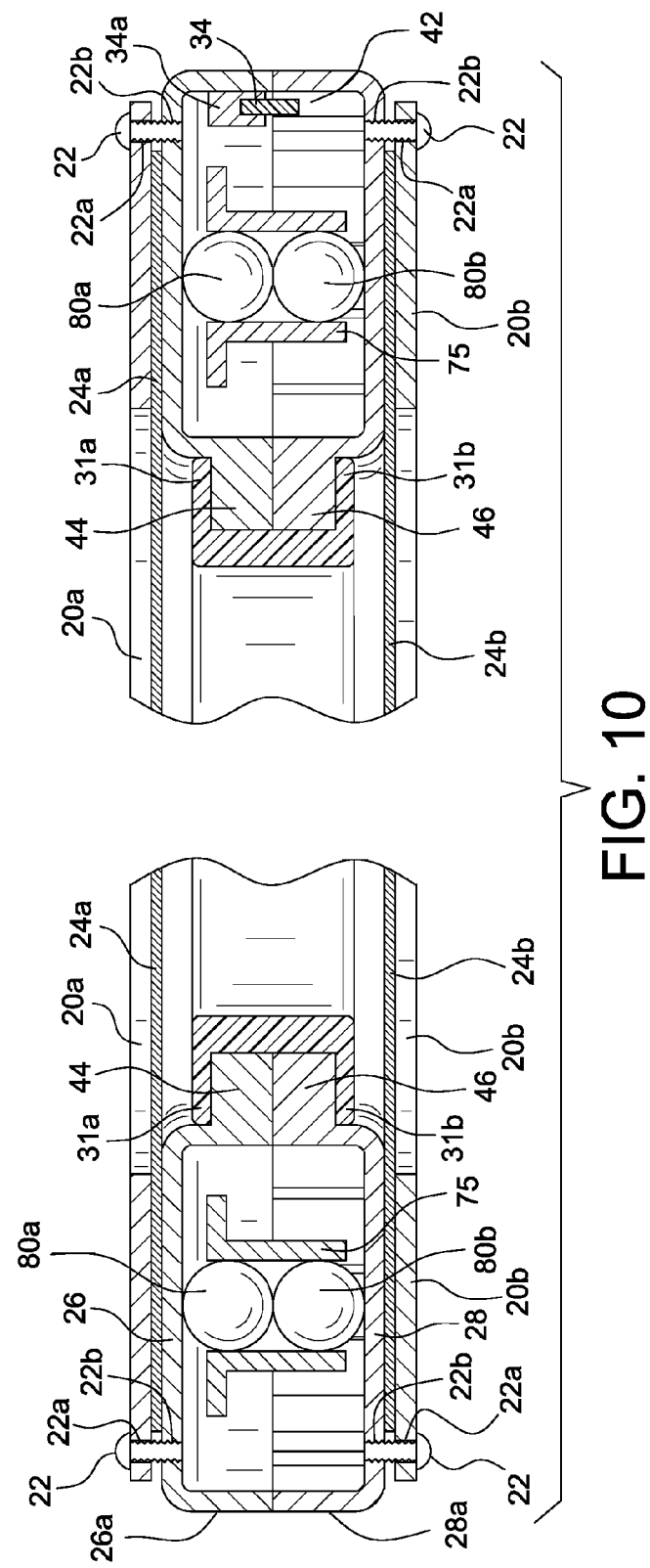
FIG. 10 shows the section view of the inventive light filtering device taken from line 10-10 of FIG. 9.

FIG. 10 illustrates an alternative embodiment wherein an upper bearing 80a and a lower bearing 80b are captured within a bearing retainer 72 (shown in section in FIG. 9). The upper bearing 80a is in rolling contact with the inner surface of the inner mounting ring 26 and the lower bearing 80b is in rolling contact with the inner surface of the outer mounting ring 28. As the upper and lower mounting rings 26, 28 rotate relative to one another, the upper and lower bearings 80a, 80b reduce friction between the upper and lower mounting rings 26, 28 to provide an extremely smooth rotational movement. Lubrication of the bearings may be provided to reduce friction even further.

Figure 11:
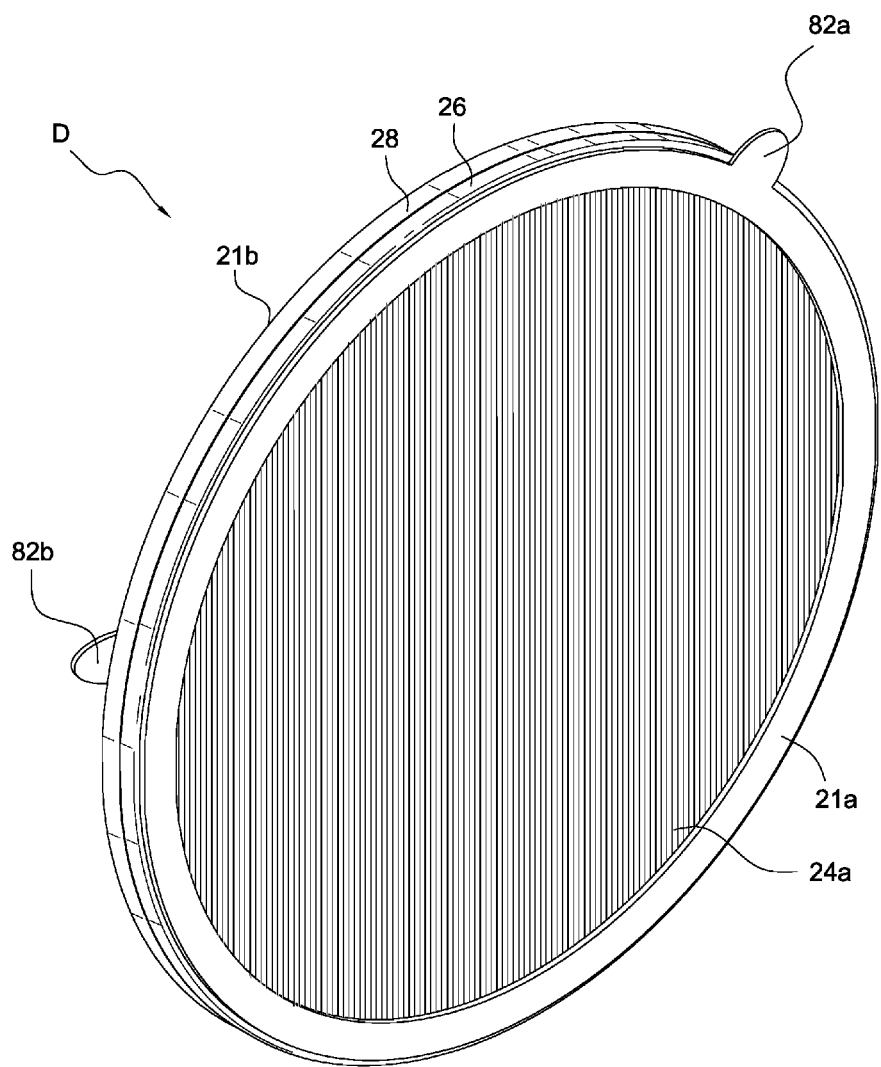
FIG. 11 shows the inventive light filtering device including a uniform retaining ring.

FIG. 11 illustrates an alternative embodiment wherein an inner uniform retaining ring 21a is secured to the inner mounting ring 26 with an adhesive or other bonding agent. The uniform retaining ring 21a sandwiches and secures the inner polarized screen 24a to the inner mounting ring 26. An outer uniform retaining ring 21b can also similarly be used to secure the outer polarized screen 24b to the outer mounting ring 28.

The inventor has contemplated using the invention to filter any light source for which it would be advantageous to reduce or filter the amount of transmitted light.

The invention is not limited to the embodiments identified above and variations may fall within the scope of the invention as claimed below.

What is claimed is:

1. A portable light filtering device for windows comprising:
   a. an inner screen and an outer screen, each of said screens comprised of a polarized film material;
   b. said inner screen being secured to an inner mounting ring with an inner retaining ring and said outer screen being secured to an outer mounting ring with an outer retaining ring;
   c. said inner mounting ring having a top inner shoulder on an inner circumference of said inner mounting ring and said outer mounting ring having a bottom inner shoulder on an inner circumference of said outer mounting ring;
   d. a coupling ring having a coupling gap on an interior circumference of said coupling ring;
   e. said inner mounting ring and said outer mounting ring being in rotatable contact with each other; said top inner shoulder of said inner mounting ring and said bottom inner shoulder of said outer mounting ring being slideably engaged with said coupling gap of said coupling ring whereby each of said coupling rings are slideably engaged and whereby said inner screen and said outer screen can rotate relative to one another.

2. A portable light filtering device for windows according to claim 1 wherein machine screws secure said inner retaining ring to said inner mounting ring and machine screws secure said outer retaining ring to said outer mounting ring.

3. A portable light filtering device for windows according to claim 1 wherein an adhesive secures said inner retaining ring to said inner mounting ring and an adhesive secures said outer retaining ring to said outer mounting ring.

4. A portable light filtering device for windows according to claim 1 wherein said outer mounting ring includes a wall positioned on an outer circumference of said outer mounting ring; and wherein said inner mounting ring includes a wall positioned on an outer circumference of said inner mounting ring; said wall of said outer mounting ring engages said wall of said inner mounting ring; a set of splines positioned along an inner surface of said wall on said outer mounting ring and a ratchet tab positioned on said wall of said inner mounting ring whereby said ratchet tab engages said set of splines to provide a ratcheting action when said outer mounting ring rotates relative to said inner mounting ring.

5. A portable light filtering device for windows according to claim 1 wherein an inner tab is provided on said inner mounting ring and an outer tab is provided on said outer mounting ring whereby said inner mounting ring and said outer mounting ring can be rotated relative to one another and whereby the relative position of each mounting ring and an amount of light restricted through said screens can be visually determined.

6. A portable light filtering device for windows according to claim 1 wherein an adjustable arm is attached to said light filtering device and a mounting fixture is attached to said adjustable arm, whereby said light filtering device can be mounted to an interior of a car door.

7. A portable light filtering device for windows according to claim 6 wherein said mounting fixture comprises a ledge mounting bracket for suspending and mounting said light filtering device to a ledge of a vehicle.

8. A portable light filtering device for windows according to claim 6 wherein said mounting fixture comprises a suction cup mounting bracket for suspending and mounting said light filtering device to a window.

9. A portable light filtering device for windows according to claim 1 wherein a plurality of bearing retainers are positioned between each of said mounting rings; at least one bearing positioned within each of said bearing retainers whereby each at least one said bearing provides for reduced friction between said mounting rings to provide easy rotation of said inner screen and said outer screen relative to one another.

10. A method of constructing a light filtering device for windows comprising the steps of:
   a. securing an inner screen comprised of a polarized film material to an inner mounting ring with an inner retaining ring;
   b. securing an outer screen comprised of a polarized film material to an outer mounting ring with an outer retaining ring;
   c. providing a top inner shoulder on an inner circumference of said inner mounting ring;
   d. providing a bottom inner shoulder on an inner circumference of said outer mounting ring;
   e. forming a coupling gap on a coupling ring on an interior circumference of said coupling ring;
   e. assembling said inner mounting ring and said outer mounting ring in rotatable contact with each other;
   f. engaging said top inner shoulder of said inner mounting ring and said bottom inner shoulder of said outer mounting ring in a slideable relationship with said coupling gap of said coupling ring whereby each of said coupling rings rotate relative to one another and whereby said inner screen and said outer screen can rotate relative to one another.

* * * * *